United States Patent
Hafeez (10) Patent No.: US 7,643,548 B2
(45) Date of Patent: Jan. 5, 2010

(54) ITERATIVE FORWARD-BACKWARD PARAMETER ESTIMATION

(75) Inventor: Abdulrauf Hafeez, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 803 days.

(21) Appl. No.: 10/950,868

(22) Filed: Sep. 27, 2004

(65) Prior Publication Data

US 2006/0067395 A1    Mar. 30, 2006

(51) Int. Cl.
*H03H 7/30* (2006.01)

(52) U.S. Cl. .................. 375/229; 375/254; 375/232; 375/350

(58) Field of Classification Search .......... 375/254, 375/232, 350, 229
See application file for complete search history.

(56) References Cited

U.S. PATENT DOCUMENTS

| | | | |
|---|---|---|---|
| 5,835,541 A | | 11/1998 | Namekata et al. |
| 5,933,462 A | * | 8/1999 | Viterbi et al. ............... 375/341 |
| 5,937,015 A | * | 8/1999 | Dent et al. .................. 375/341 |
| 6,304,618 B1 | * | 10/2001 | Hafeez et al. ............... 375/341 |
| 6,327,317 B1 | | 12/2001 | Chennakeshu et al. |
| 6,438,185 B1 | * | 8/2002 | Huttunen ................... 375/350 |
| 6,985,523 B2 | * | 1/2006 | Sims et al. .................. 375/232 |
| 7,010,069 B2 | * | 3/2006 | Chugg et al. ................ 375/346 |
| 7,058,148 B1 | * | 6/2006 | Huttunen ................... 375/354 |
| 7,092,457 B1 | * | 8/2006 | Chugg et al. ................ 375/324 |
| 7,130,342 B2 | * | 10/2006 | Buckley et al. ............. 375/229 |
| 7,346,130 B2 | * | 3/2008 | Kobylinski et al. ......... 375/341 |
| 2002/0159547 A1 | * | 10/2002 | Lindoff et al. .............. 375/343 |
| 2005/0084039 A1 | * | 4/2005 | Kocic et al. ................. 375/319 |
| 2005/0259728 A1 | * | 11/2005 | Nieto .......................... 375/233 |
| 2006/0029168 A1 | * | 2/2006 | Chuang et al. .............. 375/347 |

OTHER PUBLICATIONS

See et al., "A Forward Backward Approach to Adaptive Space-Time Identification and Equalization of Time-Varying Channels," IEEE International Conference on Acoustics, Speech, and Signal Processing, May 12, 1998, pp. 3369-3372, vol. 6, Conf. 23.

(Continued)

*Primary Examiner*—Shuwang Liu
*Assistant Examiner*—Kenneth Lam
(74) *Attorney, Agent, or Firm*—Coats & Bennett, P.L.L.C.

(57) ABSTRACT

A method and apparatus for jointly estimating channels used to propagate desired and interfering signals received by a wireless receiver. A blind parameter estimator in the wireless receiver includes a forward parameter estimator and a backward parameter estimator that each include an equalizer and a channel estimator for generating forward and backward channel estimates, respectively, for the desired and interfering signal channels. In one embodiment, the blind parameter estimator includes independent forward and backward parameter estimators that generate independent forward and backward channel estimates, respectively, where a final channel selector selects the final channel estimates based on a comparison between error metrics associated with the forward and backward channel estimates. In another embodiment, the blind parameter estimator includes serial per-survivor processing forward and backward parameter estimators that uses the backward channel estimates as the final channel estimates for the desired and interfering signal channels.

42 Claims, 8 Drawing Sheets

OTHER PUBLICATIONS

Ranta, Pekka A.; Hottinen, Ari; and Honkasalo, Zhi-Chun, "Co-Channel Interference Cancelling Receiver for TDMA Mobile Systems," *Proc. IEEE ICC*, 1995, pp. 17-21.

Arslan, Hüseyin; Gupta, Someshwar C.; Bottomley, Gregory E., "New Approaches to Adjacent Channel Interference Suppression in FDMA/TDMA Mobile Radio System," *IEEE Transactions on Vehicular Technology*, vol. 49, No. 4, Jul. 2000, pp. 1126-1138.

Schoeneich, Hendrik and Hoeher, Peter A., "Single Antenna Cochannel Interference Cancellation in Asynchronous TDMS Systems," Sixth Baiona Workshop on Signal Processing in Communications, Sep. 9, 2003, www.baionaworkshop.org/Proceedings/hoeher1.pdf.

Raheli, Riccardo; Polydoros, Andreas; and Tzou, Ching-Kae, "Per-Survivor Processing: A General Approach to MLSE in Uncertain Environments," *IEEE Transactions on Communications*, vol. 43, No. 2/3/4, Feb./Mar./Apr. 1995, pp. 354-364.

Lo, Ben Chi Wah and Letaief, Khaled Ben, "Adaptive Equalization and Interference Cancellation for Wireless Communication Systems," *IEEE Transactions on Communications*, vol. 47, No. 4, Apr. 1999, pp. 538-545.

Paparisto, Gent; Panagiotou, Prokopios; and Chugg, Keith M., "A Single-Packet Method for Adaptive Maximum Likelihood CCI Identification and Mitigation," in Proc. IEEE Global Telecommun. Conf., Rio de Janeiro, Brazil, Dec. 5-9, 1999, pp. 492-496.

Polydoros, Andreas and Chugg, Keith M., "PerSurvivor Processing (PSP)," www.phys.uoa.gr/el-lab/polydoros/psp/psp.html, 26 pages.

Davis, Linda; Collings, Iain; and Hoeher, Peter, "Joint Map Equalization and Channel Estimation for Frequency-Selective Fast-Fading Channels," GlobeCom-98 CTMC, Sydney, Australia (Nov. 1998), pp. 53-58.

Omidi, M. Javad; Gulak, P.G.; and Pasupathy, S., "Parallel Structures for Joint Channel Estimation and Data Detection Over Fading Channels," Proceedings of IEEE VLSI Signal Processing IX, 1996, pp. 325-336.

\* cited by examiner

ITERATIVE FORWARD-BACKWARD PARAMETER ESTIMATION

BACKGROUND OF THE INVENTION

The present invention generally relates to processing received wireless communication signals and particularly relates to using joint channel estimation to cancel interfering signals from a received wireless communication signal.

In response to an ever-increasing demand for wireless services, wireless providers continue searching for new ways to increase the capacity of current wireless networks. Because interference within a system limits capacity, one way to increase system capacity is to reject or cancel interference using digital signal processing techniques. Interference cancellation can be performed by jointly demodulating the desired and interfering signals. One type of joint demodulation requires the received signal to contain synchronized desired and interfering signals. When the desired and interfering signals are synchronized, the training symbol period of the interfering signal roughly overlaps the training symbol period of the desired signal. As a result, the joint demodulation process may exploit the overlapping training sequences present in the received signal to jointly estimate the desired and interfering signal channels.

However, the desired and interfering signals received by the wireless communication device are not always synchronized, e.g., in current Time Division Multiple Access (TDMA) cellular radiotelephone systems like Global System for Mobile communications (GSM), Enhanced Data Rates for GSM Evolution (EDGE), and Digital-Advanced Mobile Phone Service (D-AMPS). As a result, the training sequence of the interfering signals does not overlap the training sequence of the desired signal, which negatively impacts the performance of the synchronized joint channel estimation process discussed above.

To address this problem, the wireless industry continues to explore methods of joint channel estimation that do not require the desired and interfering signals to be synchronized, and therefore, do not require knowledge of the training symbols associated with the interfering signal.

SUMMARY OF THE INVENTION

The present invention comprises a method and apparatus that uses a known symbol sequence associated with a desired signal to jointly estimate parameters of the radio channel that propagate the desired and interfering signals received by the wireless communication device. According to the present invention, a blind parameter estimator in a receiver of the wireless communication device includes a forward parameter estimator and a backward parameter estimator. Each of the forward and backward parameter estimators includes an equalizer and a channel parameter estimator that generate forward and backward parameter estimates, respectively, for each of the desired and interfering signal channels based on iterative forward/backward recursions through the equalizer. Based on at least one of the generated forward and backward parameter estimates, the blind parameter estimator generates final parameter estimates for the desired and interfering signal channels.

According to one exemplary embodiment, the blind parameter estimator comprises independent forward and backward parameter estimators that independently perform forward and backward recursions to generate forward and backward parameter estimates, respectively, for the desired and interfering signal channels. In some embodiments, one or both of the forward and backward parameter estimators may comprise a per-survivor processing (PSP) parameter estimator that generates the forward/backward parameter estimates from tentative parameter estimates produced at each stage of the forward/backward recursion for a plurality of hypothesized survivor paths.

In either case, each of the forward and backward parameter estimators independently perform one or more iterations of each of the forward and backward recursions, where the forward/backward parameter estimates resulting from a current iteration operate as initial forward/backward parameter estimates for a subsequent iteration. After the final iteration, a final parameter selector selects the final parameter estimates for each of the desired and interfering signal channels based on a comparison between forward and backward error metrics associated with the final iteration's forward and backward parameter estimates, respectively.

According to another exemplary embodiment of the present invention, the blind parameter estimator comprises serial first and second PSP parameter estimators. In this embodiment, the first parameter estimator generates tentative first parameter estimates in a first direction at each stage of the first recursion based on the received signal and initial first parameter estimates for a plurality of hypothesized forward survivor paths. Based on the tentative first parameter estimates, the first parameter estimator generates a set of first parameter estimates. Similarly, the second parameter estimator generates tentative second parameter estimates in a second, opposite direction at each stage of the second recursion based on the received signal and initial second parameter estimates for a plurality of hypothesized second survivor paths, where the recently generated set of first parameter estimates operate as the initial second parameter estimates. Based on the tentative second parameter estimates, the second parameter estimator generates a set of second parameter estimates.

In this embodiment, the exemplary blind parameter estimator performs one or more iterations, where a single iteration includes the first recursion in the first direction followed by the second recursion in the second direction. In some embodiments, a single iteration may include additional recursions in alternating directions. When subsequent iterations are performed, the set of second parameter estimates generated by the second parameter estimator in a current iteration operate as the initial first parameter estimates for the first parameter estimator in a subsequent iteration. After the final iteration, the blind parameter estimator uses the set of second parameter estimates generated in the final iteration as the final parameter estimates for the desired and interfering signal channels.

DETAILED DESCRIPTION OF THE INVENTION

Figure 1:
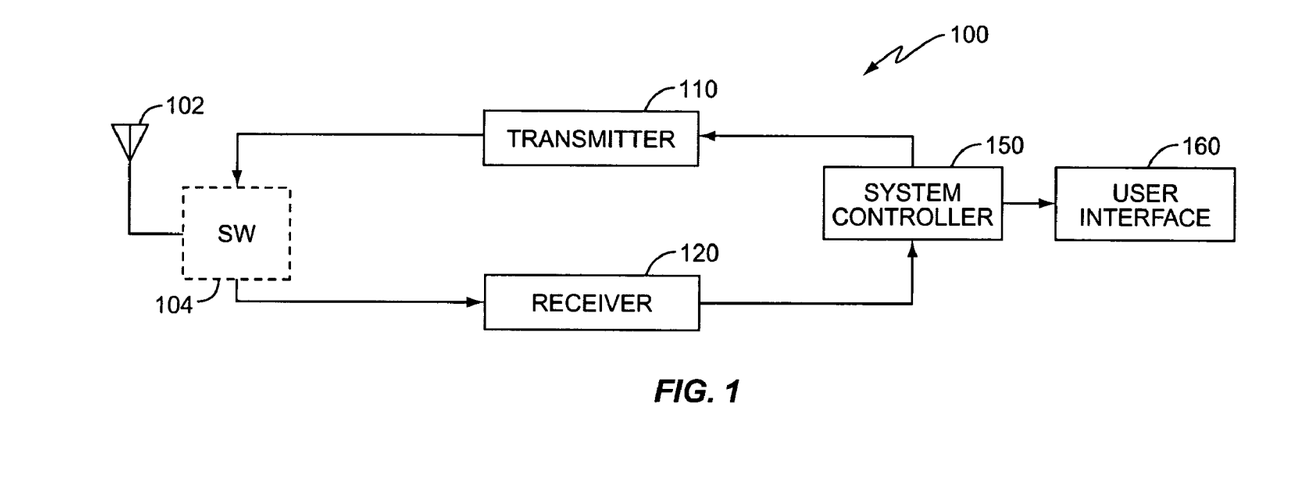
FIG. 1 illustrates a block diagram of one exemplary wireless communication device according to the present invention.

FIG. 1 illustrates one exemplary wireless communication device 100, such as a mobile terminal, base station, or any other wireless device that includes a wireless receiver. As used herein, the term "mobile terminal" may include cellular telephones, satellite telephones, personal communication services (PCS) devices, personal data assistants (PDAs), palm-top computers, laptop computers, pagers, and the like. Further, those skilled in the art should note the present invention is described in one or more exemplary embodiments relating to GSM/EDGE wireless communication networks, but such descriptions are not limiting. Therefore, it should be understood that the present invention has a broad range of applicability, including other wireless communication standards including, but not limited to, Universal Mobile Telecommunication System (UMTS), TIA/EIA-136, Code Division Multiple Access (CDMA), cdmaOne, cdma2000, and Wideband CDMA.

As illustrated, wireless communication device 100 includes an antenna 102, an optional antenna switch 104, a transmitter 110, a receiver 120, a system controller 150, and a user interface 160. In one exemplary embodiment, system controller 150 stores and executes program instructions that control transmitter 110, receiver 120, and optional antenna switch 104. Further, system controller 150 interfaces the communication electronics (transmitter 110 and receiver 120) with the user interface 160. When optional antenna switch 104 connects transmitter 110 to antenna 102, transmitter 110 transmits wireless communication signals according to a predefined communication standard. Similarly, when optional antenna switch 104 connects receiver 120 to antenna 102, receiver 120 receives and processes a received wireless communication signal according to a predefined communication standard. It will be appreciated by those skilled in the art that when the transmitter 110 and the receiver 120 of wireless communication device 100 are decoupled in frequency, antenna switch 104 may be omitted.

Figure 2:
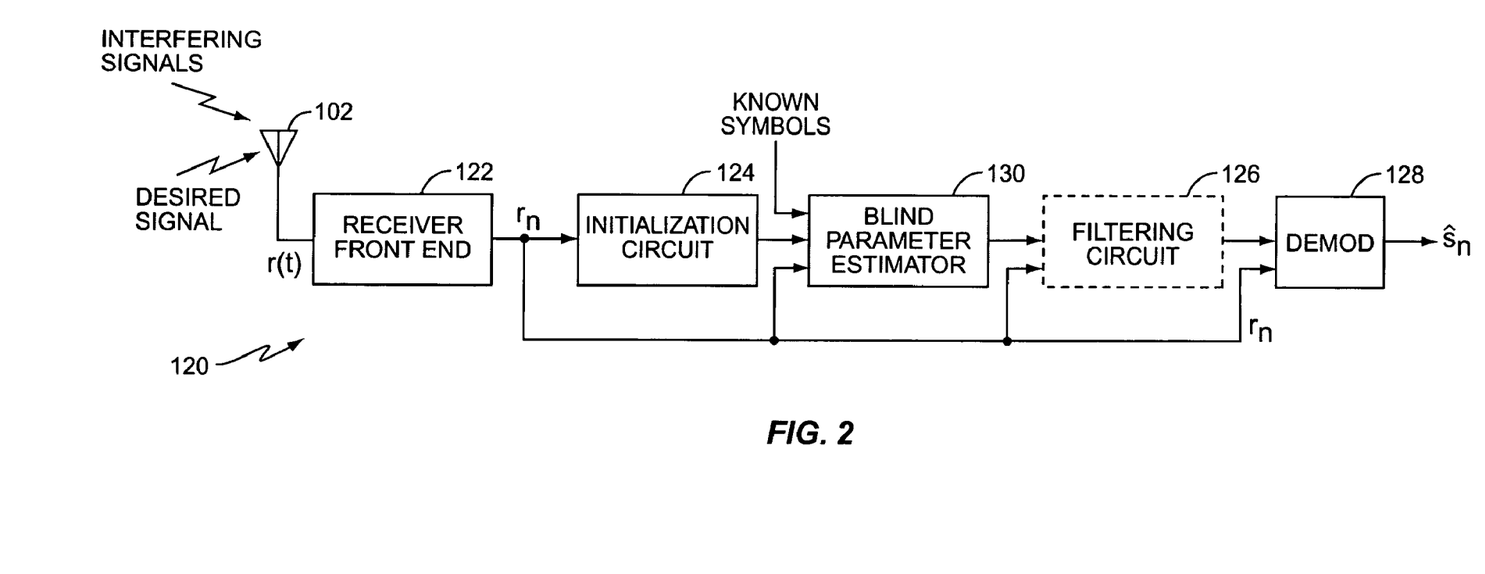
FIG. 2 illustrates a block diagram of one exemplary wireless receiver in the wireless communication device of FIG. 1.

FIG. 2 illustrates one exemplary embodiment of wireless communication receiver 120. As shown in FIG. 2, the receiver 120 receives wireless communication signals that represent a combination of a desired signal and one or more interfering signals, where the desired signal includes a sequence of training symbols known to the receiver 120. It will be appreciated by those skilled in the art that the interfering signals may use the same or a different modulation type as the desired signal. For purposes of the following discussion, the interfering signal may include any type of interference, such as co-channel interference, adjacent channel interference, etc., and is asynchronous with the desired signal. Therefore, the training symbols and the timing associated with the interfering signal are unknown to receiver 120. However, those skilled in the art will appreciate that the invention described below may also be applied to a received signal having synchronous desired and interfering signals.

Receiver 120 includes front-end 122, initialization circuit 124, filtering circuit 126 (optional), demodulator or joint demodulator 128, and blind parameter estimator 130. Front-end 122 processes a desired signal and one or more interfering signals received at antenna 102 to provide a sampled signal $r_n$ to initialization circuit 124 and blind parameter estimator 130 using filters, amplifiers, analog-to-digital converters, mixers, etc., as understood in the art.

Initialization circuit 124 generates initial channel estimates for each of the desired signal channel and the interfering signal channel. The initial channel estimates for the desired signal channel may be generated by any known means. For example, because receiver 120 has prior knowledge of the training symbols associated with the desired signal, initialization circuit 124 may use the Least Squares (LS) estimation process to generate initial channel estimates for the desired signal channel using the known training symbols. Alternatively, in interference-limited environments, initialization circuit 124 may use the Constant Envelope (CE) method, which models the interference as a constant envelope process.

However, because receiver 120 does not have prior knowledge of the training sequence or the timing of the interfering signal, the above-described methods used to generate the initial channel estimates for the desired signal channel cannot be used to generate the initial channel estimates for the interfering signal channel. Instead, initialization circuit 124 may use a predefined value as the initial interfering channel estimate. For example, initialization circuit 124 may set all of the channel taps of the initial interfering channel estimate to zero. Alternatively, initialization circuit 124 may set one of the channel taps to a small value greater than zero, such as 0.1, and set the remaining channel taps to zero. Typically, the initialization circuit 124 positions the non-zero channel tap proximate the middle of the initial channel estimate.

After initialization circuit 124 generates the initial channel estimates for the desired and interfering signal channels, blind parameter estimator 130 uses joint channel estimation to generate the final channel estimates for the desired and interfering signal channels, as discussed further below. While not required, receiver 120 may also include filtering circuits 126, as shown in FIG. 2, to further reduce noise affecting the signals to be demodulated by demodulator 128. For example, filtering circuits 126 may include a whitening filter to whiten the noise. Filtering circuits 126 may also include a pre-filter to compact the signal energy in the leading channel taps of the whitened channel estimates. In any event, demodulator 128 demodulates the received signal $r_n$ using the desired signal channel estimate generated by blind parameter estimator 130 and optionally filtered by filtering circuit 126 to estimate the desired signal. It will be appreciated by those skilled in the art that demodulator 128 may be a conventional demodulator or a joint demodulator that jointly detects the symbols of the desired user and interferer(s).

As discussed above, the blind parameter estimator 130 of the present invention jointly estimates the desired and interfering signal channels to reduce interference, and therefore, to improve signal quality and network capacity. To better understand the operation of blind parameter estimator 130, a brief explanation of the operation of conventional blind parameter estimators is provided herein. A conventional blind parameter estimator 132, shown in FIG. 3, includes an equalizer 134 and a channel estimator 136. In general, equalizer 134 comprises any known equalizer, such as a Viterbi equalizer, a decision feedback equalizer, etc., that uses the sampled received signal $r_n$, the known training symbols of the desired signal, and the initial channel estimates provided by initialization circuit 124 to detect the symbols of the interfering signal that overlap the training period of the desired user's training symbols. It will be appreciated that equalizer 134 may use any known algorithm, such as the Viterbi algorithm, the List Viterbi algorithm, the Generalized Viterbi algorithm, etc. More particularly, at each stage of a recursion through the equalizer, equalizer 134 generates an error signal for each surviving path. Equations (1) through (4) mathematically illustrate this process.

Figure 3:
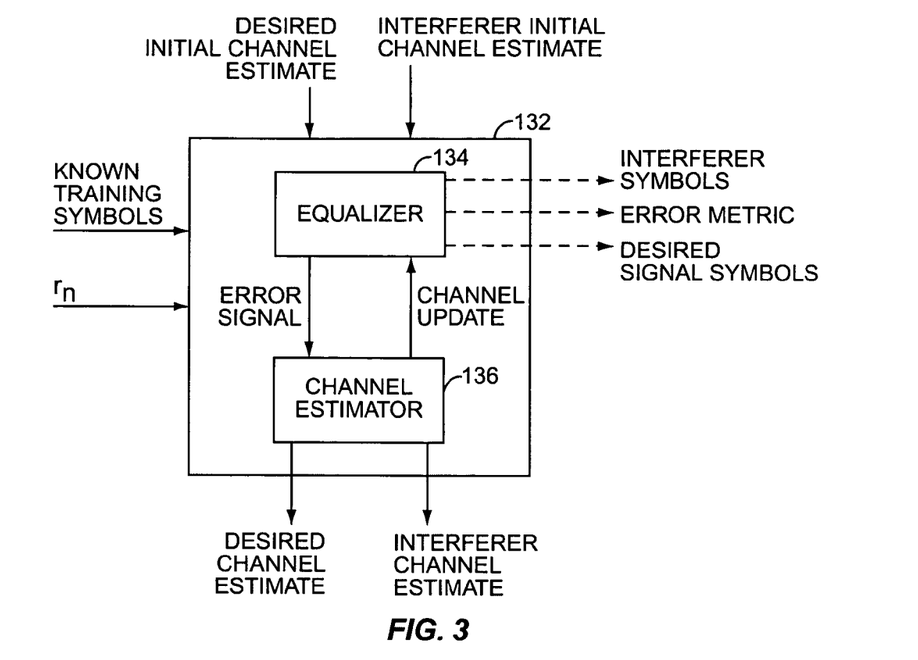
FIG. 3 illustrates a block diagram of one exemplary unidirectional parameter estimator.

Equation (1) represents the sampled received signal $r_n$:

$$r_n = \sum_{i=0}^{L_1} c_{1,i} s_{1,n-i} + e^{j(\phi_2 - \phi_1)n} \sum_{i=0}^{L_2} c_{2,i} s_{2,n-i} + w_n, \quad (1)$$

where $w_n$ represents white Gaussian noise, $s_{k,n}$ represents the symbols of the $k^{th}$ signal (herein, k=1 represents the desired signal and k=2 represents an interfering signal), $c_{k,i}$ represents the $i^{th}$ channel tap of the $k^{th}$ signal channel (spanning i=1, 2, ..., $L_k$+1 symbols), and $\phi_k$ represents the modulation rotation angle for user k. As used herein k=1 represents the desired signal and k=2 represents the interfering signal(s). The received signal of Equation (1) may also be written in vector notation as:

$$r_n = \underline{c}_1^T \underline{s}_1(n) + \psi_n \underline{c}_2^T \underline{s}_2(n) + w_n \quad (2)$$

where $\underline{c}_k [c_{k,0}, c_{k,1}, \ldots c_{k,L_k}]^T$, $\underline{s}_k(n) = [s_{k,n}, s_{k,n-1}, \ldots s_{k,n-L_k}]^T$, and $\psi_n = e^{j(\phi_2 - \phi_1)n}$.

In operation, equalizer 134 may be any known equalizer, such as a Maximum Likelihood Sequence Estimation (MLSE) equalizer, a Decision Feedback Sequence Estimation (DFSE) equalizer, etc. For example, supposing that the desired signal symbols are known to the receiver, an MLSE equalizer finds the interfering signal symbols that minimize the error metric:

$$\Lambda_n = \sum_{i=1}^{n} |\hat{\varepsilon}_i|^2. \quad (3)$$

In Equation (3), $\hat{\varepsilon}_n$ represents an error signal given by:

$$\hat{\varepsilon}_n = r_n - \underline{\tilde{c}}_1^T(n) \underline{s}_1(n) + \psi_n \underline{\tilde{c}}_2^T(n) \underline{\hat{s}}_2(n), \quad (4)$$

where $\underline{\tilde{c}}_k(n)$ represent the channel taps for the $k^{th}$ signal at sample time n (for the first time instant the channel taps are obtained from initialization circuit 124), and $\underline{\hat{s}}_2(n)$ are the hypothesized symbols for the interfering signal produced by the equalizer 134 in, for example, a trellis.

Using the interferer symbol decisions associated with the surviving path having the best error metric $\Lambda_n$, channel estimator 136 jointly estimates the desired and interfering signal channels. For example, channel estimator 136 may comprise a Least Means Squares (LMS) estimator that estimates the desired and interfering signal channels according to:

$$\underline{\tilde{c}}_1(n+1) = \underline{\tilde{c}}_1(n) + \mu_1 \tilde{\varepsilon}_n \underline{s}_1^*(n) \quad (5)$$

$$\underline{\tilde{c}}_2(n+1) = \underline{\tilde{c}}_2(n) + \mu_2 \tilde{\varepsilon}_n \psi_n^* \underline{\hat{s}}_2^*(n), \quad (6)$$

where $\tilde{\varepsilon}_n$ is the error signal associated with the interferer signal decisions $\underline{\hat{s}}_2(n)$, $\mu_k$ is the LMS step size for user k, and * indicates the Hermetian transpose operation. At the first stage of the equalizer trellis, channel estimator 136 uses the initial channel estimates provided by initialization circuit 124. However, after the first stage, channel estimator 136 provides updated channel estimates at each stage. During each subsequent stage, equalizer 134 uses the updated channel estimates generated by the channel estimator 136 for the current stage to proceed to the next stage. Once the equalizer trellis has been traversed, the updated channel estimates generated by channel estimator 136 from the final stage of the equalizer trellis are output as the final channel estimates for the desired and interfering signal channels. While the above is described in terms of LMS channel estimation, it will be appreciated by those skilled in the art that other channel estimation processes may also be used, such as Recursive Least Squares (RLS).

Figure 4:
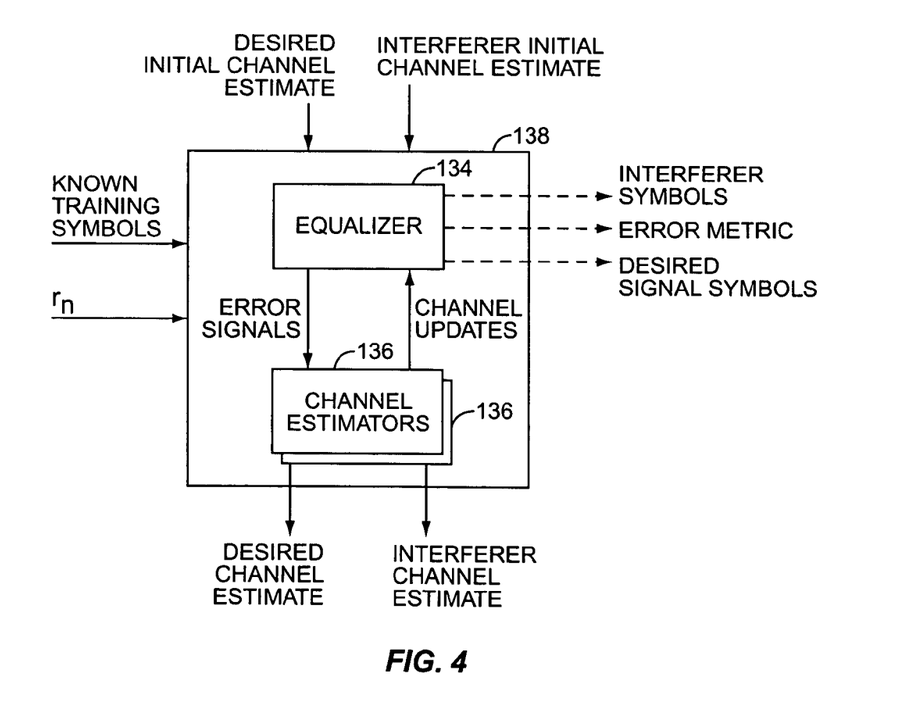
FIG. 4 illustrates a block diagram of one exemplary PSP unidirectional parameter estimator.

FIG. 4 illustrates another conventional parameter estimator 138 that may be used to jointly estimate desired and interfering channel estimates to reduce interference. The parameter estimator 138 of FIG. 4 is a per-survivor processing (PSP) parameter estimator that includes equalizer 134 and multiple channel estimators 136. The PSP parameter estimator 138 includes a channel estimator 136 for each surviving path or state in the equalizer trellis. It will be appreciated that the parameter estimator 138 of FIG. 4 may also represent a multiple survivor processing (MSP) parameter estimator, where multiple channel estimators 136 are coupled with each survivor path or state in the equalizer trellis.

In any event, the channel updates for PSP LMS parameter estimation may be given by:

$$\underline{\hat{c}}_1(n+1) = \underline{\hat{c}}_1(n) + \mu_1 \hat{\varepsilon}_n \underline{s}_1^*(n) \quad (7)$$

$$\underline{\hat{c}}_2(n+1) = \underline{\hat{c}}_2(n) + \mu_2 \hat{\varepsilon}_n \psi_n^* \underline{\hat{s}}_2^*(n). \quad (8)$$

where $\underline{\hat{c}}_k(n)$ are per-survivor channel estimates for the desired and interfering signal channels obtained by the channel estimator 136 at each stage of the recursion through the equalizer trellis for each hypothesized surviving path, $\underline{\hat{s}}_2(n)$ are hypothesized interfering signal symbols obtained from equalizer 134 for each hypothesized surviving path, and $\hat{\varepsilon}_n$ is the corresponding error signal. After the final stage, the parameter estimator 138 of FIG. 4 selects the channel estimates associated with the best error metric as the final channel estimate for each of the desired and interfering signal channels.

The parameter estimators 132, 138 shown in FIGS. 3 and 4, respectively, may be used for either forward or backward recursions through the equalizer trellis. Further, while not explicitly shown, either parameter estimator 132, 138 may perform multiple parameter estimation iterations through the equalizer trellis to generate the final channel estimates for the desired and interfering signal channels, as well as desired and interfering signal symbol estimates. In this scenario, the initial channel estimates used by parameter estimator 132, 138 in the first iteration are the initial channel estimates provided by initialization circuit 124. However, subsequent iterations may use the channel estimates generated by the preceding iteration as the initial channel estimates for the subsequent iteration. Multiple iterations, and how they relate to the present invention, are discussed further below.

Figure 5:
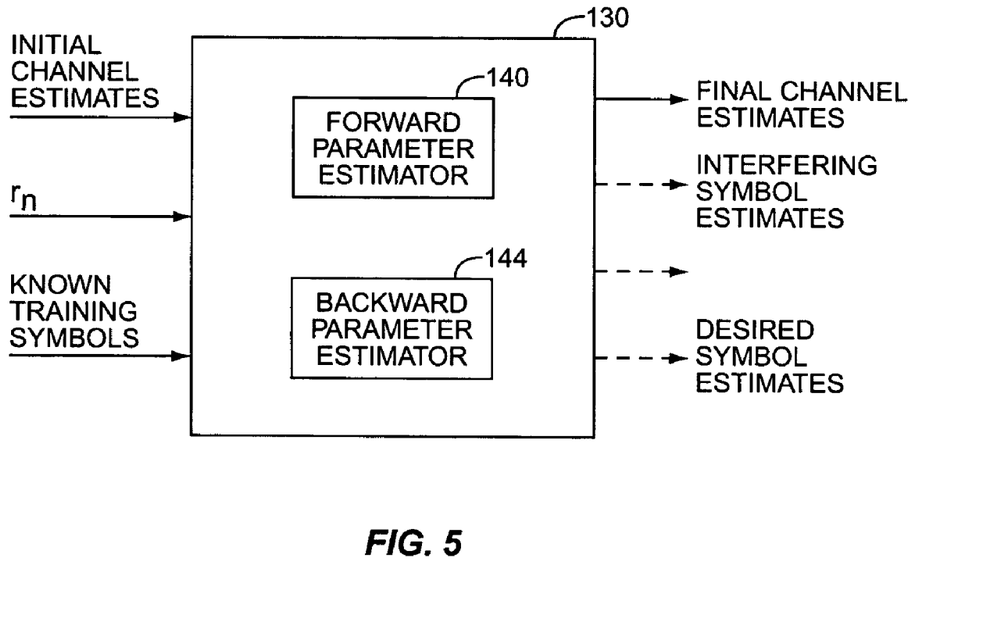
FIG. 5 illustrates a block diagram of a multi-directional parameter estimator according to the present invention.

Turning now to FIGS. 5-10, various embodiments of the present invention will be discussed. FIG. 5 illustrates a generic embodiment of the inventive blind parameter estimator 130. According to the present invention, blind parameter estimator 130 includes a forward parameter estimator 140 and a backward parameter estimator 144. Forward and backward parameter estimators 140 and 144 may comprise any parameter estimators that use a forward or backward recursion, respectively, through the equalizer trellis to perform joint channel estimation, such as the parameter estimators 132 and 138 shown in FIGS. 3 and 4, respectively, and described above. Generally, the forward and backward parameter estimators 140 and 144 use known training symbols associated with the desired signal to jointly estimate the desired and interfering signal channels. However, it will be appreciated by those skilled in the art that any sequence of symbols associated with the desired signal and known to the receiver may be used.

Each of the forward and backward parameter estimators 140 and 144 include an equalizer 134 and at least one channel estimator 136 that generates forward and backward channel estimates, respectively, for each of the desired and interfering signal channels based on iterative forward/backward recursions through the equalizer trellis. Based on at least one of the generated forward and backward channel estimates, blind parameter estimator 130 generates final channel estimates for the desired and interfering signal channels. Further, as mentioned above, blind parameter estimator 130 may also provide symbol estimates for the interfering signal and the desired signal.

Figure 6:
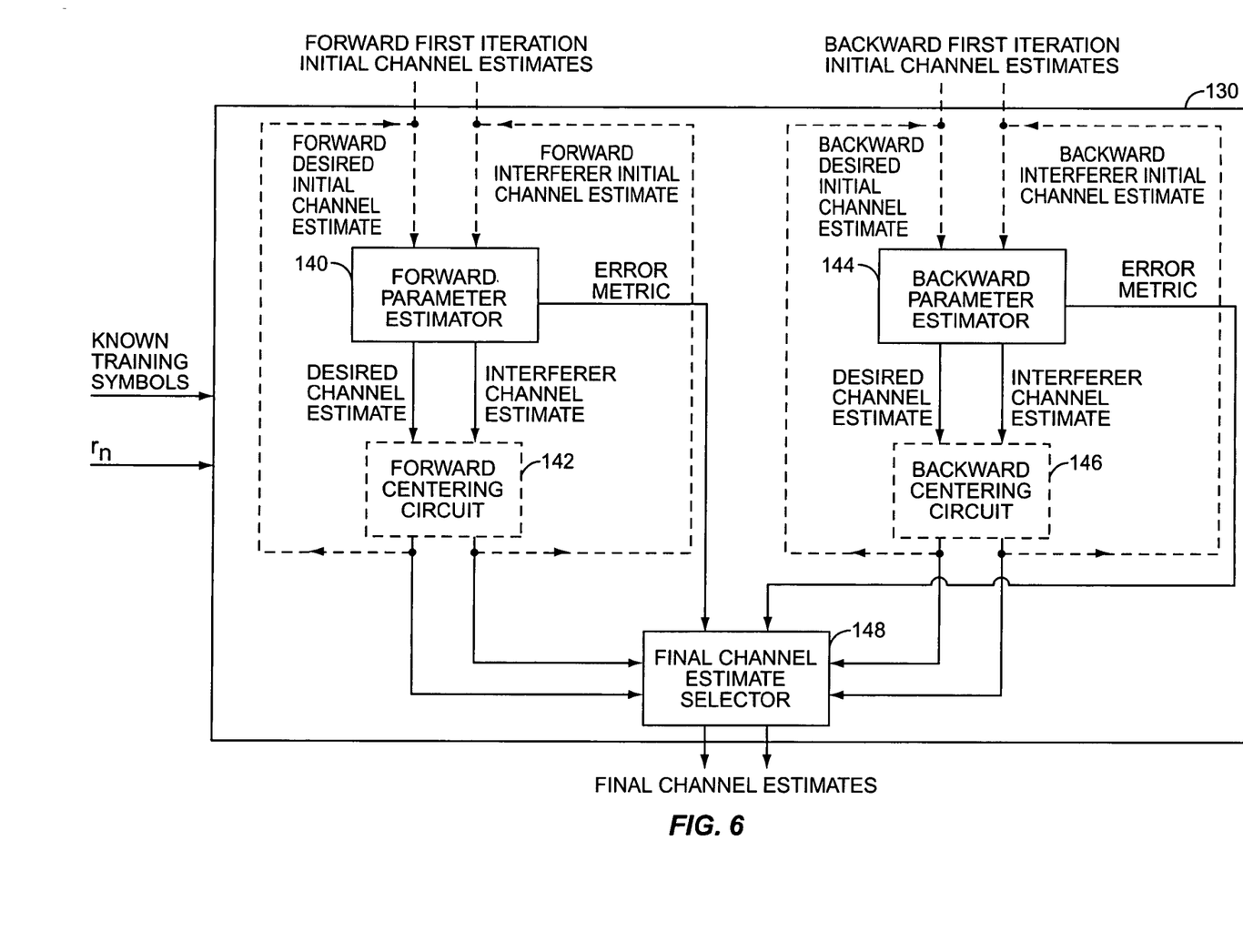
FIG. 6 illustrates a block diagram of one exemplary multi-directional parameter estimator according to the present invention.
Figure 7:
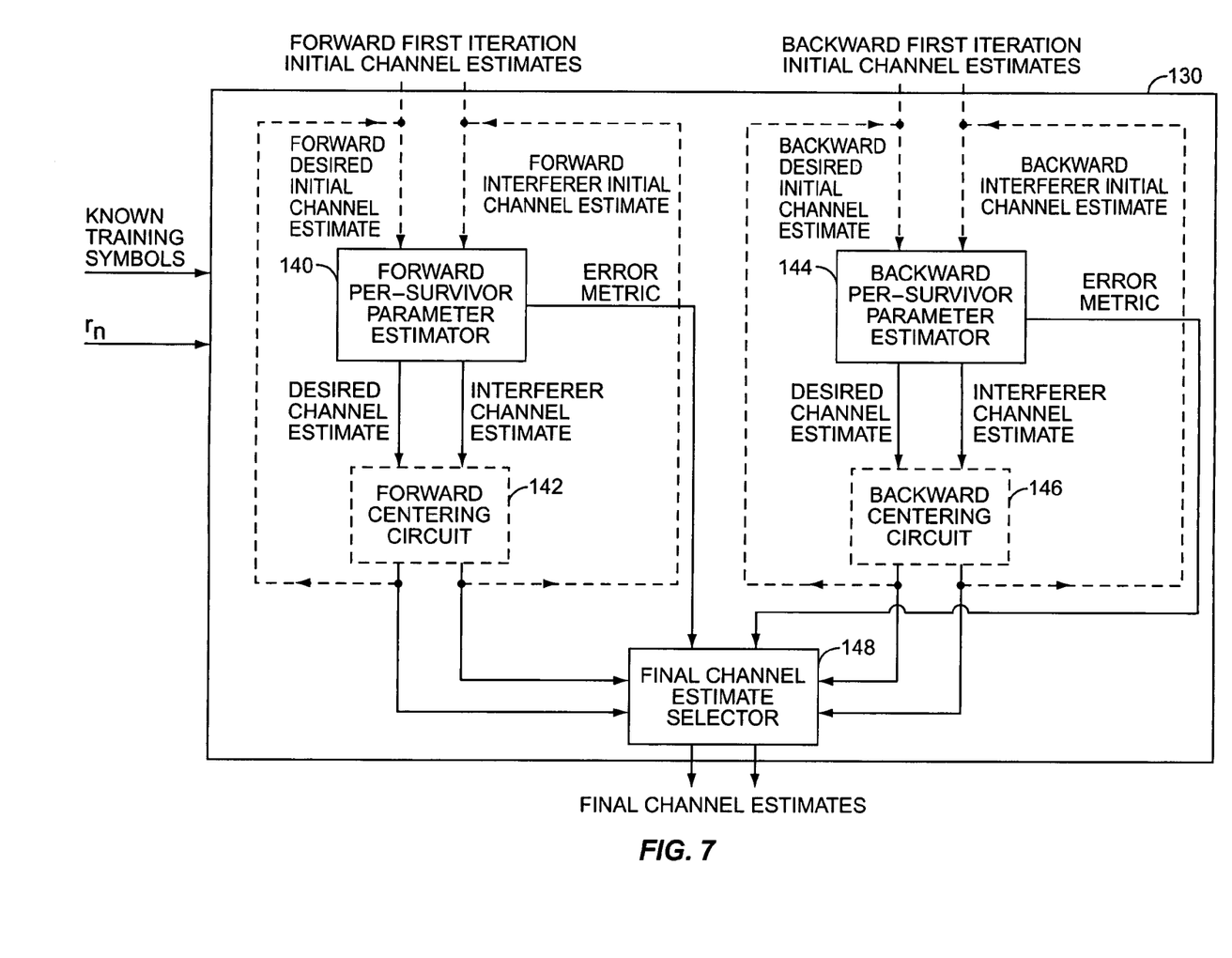
FIG. 7 illustrates a block diagram of one exemplary PSP multi-directional parameter estimator according to the present invention.

FIG. 6 shows one example of a blind parameter estimator 130 according to the present invention. Blind parameter estimator 130 includes forward parameter estimator 140, optional forward centering circuit 142, backward parameter estimator 144, optional backward centering circuit 146, and final channel estimate selector 148. In this embodiment, the forward parameter estimator 140 and the backward parameter estimator 144 operate independently to generate forward and backward channel estimates, respectively, based on the known training symbols and initial forward and backward channel estimates. As shown in FIG. 6, forward parameter estimator 140 may iteratively perform one or more forward recursions through the equalizer trellis to generate forward channel estimates for each of the desired and interfering signal channels. The initial forward channel estimates used in the first iteration are the initial forward channel estimates provided by initialization circuit 124. However, when subsequent iterations are performed, forward parameter estimator 140 uses the forward channel estimates generated in the current iteration as the initial forward channel estimates for the subsequent iteration.

Similarly, backward parameter estimator 144 iteratively performs backward recursions through the equalizer trellis to generate backward channel estimates for each of the desired and interfering signal channels. Further, the initial backward channel estimates used in the first iteration are the initial backward channel estimates provided by initialization circuit 124. However, when subsequent iterations are performed, backward parameter estimator 144 uses the backward channel estimates generated in the current iteration as the initial backward channel estimates for the subsequent iteration.

After the final iteration, the forward parameter estimator 140 and the backward parameter estimator 144 provide the forward and backward channel estimates from the final iteration, respectively, along with the corresponding forward and backward error metrics to the final channel estimate selector 148. Final channel estimate selector 148 compares the forward error metric to the backward error metric to select one of the forward or backward channel estimates as the final channel estimates. In one exemplary embodiment, final channel estimate selector 148 selects the channel estimates associated with the best (lowest) error metric as the final channel estimates.

For the embodiments that include forward centering circuit 142 and/or backward centering circuit 146, the forward and backward channel estimates generated by the forward and backward parameter estimators 140 and 144, respectively, are centered according to conventional means to center the channel response taps of the forward channel estimates and/or the backward channel estimates. Centering refers to the shifting of the channel response taps so that the largest tap lies in the middle of the vector of channel response taps. For example, in the case of a 3-tap channel, the channel response taps may be shifted to the right/left by one position if the left most/right most tap is the largest tap; the incoming tap is typically set to zero. It will be appreciated by those skilled in the art that whenever the desired signal channel estimate is shifted left or right, the received signal also has to be shifted an equivalent number of positions in the opposite direction. As a result, centering may also improve synchronization.

In any event, forward centering circuit 142 centers the forward channel estimates generated by each iteration performed by forward parameter estimator 140 except for the last iteration. Similarly, backward centering circuit 146 centers the backward channel estimates generated in each iteration performed by backward parameter estimator 144 except the final iteration. The centered forward/backward channel estimates generated in each iteration are then used as the initial forward/backward channel estimates for the next iteration. After the final iteration, the forward centering circuit 142 and the backward centering circuit 146 are bypassed so that the final channel estimate selector 148 receives the channel estimates and the corresponding error metric generated by the forward parameter estimator 140 and the backward parameter estimator 144.

The embodiment shown in FIG. 6 may use the parameter estimator 132 shown in FIG. 3 for each of the forward parameter estimator 140 and the backward parameter estimator 144. However, as discussed above, the blind parameter estimator 130 of the present invention is not limited to this type of parameter estimator. For example, in one alternative embodiment of the present invention shown in FIG. 7, the forward parameter estimator 140 and/or the backward parameter estimator 144 may use the PSP parameter estimator 138 shown in FIG. 4.

Figure 8:
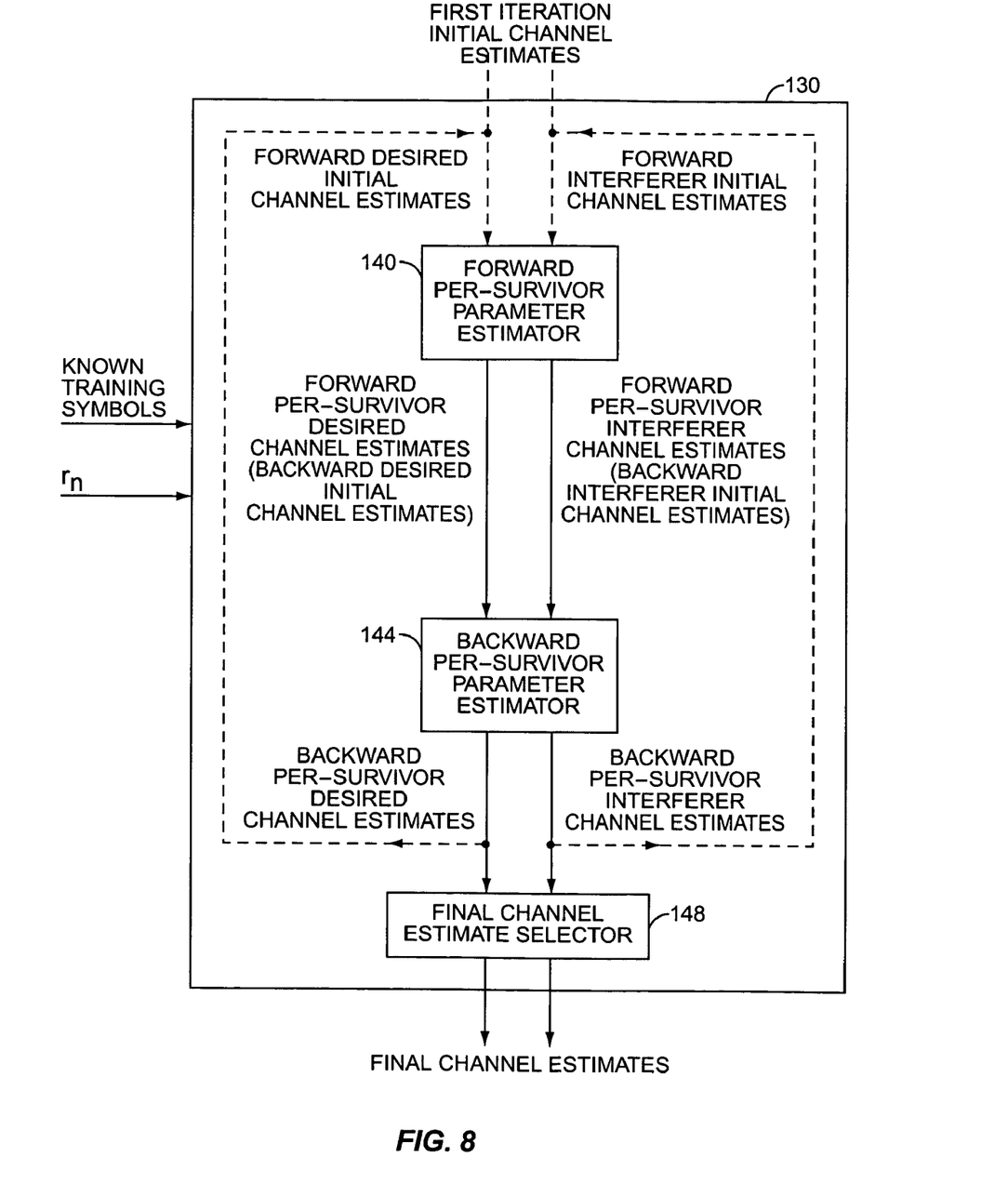
FIG. 8 illustrates another block diagram of one exemplary PSP multi-directional parameter estimator according to the present invention.

Another alternative embodiment of the blind parameter estimator 130 of the present invention is shown in FIG. 8. Like the embodiment shown in FIG. 7, the blind parameter estimator 130 of FIG. 8 includes a forward parameter estimator 140 and a backward parameter estimator 144. However, unlike the embodiment shown in FIG. 7, the embodiment of FIG. 8 includes serial forward and backward parameter estimators 140 and 144.

In the embodiment illustrated in FIG. 8, the forward parameter estimator 140 comprises a PSP parameter estimator, such as the PSP parameter estimator 138 of FIG. 4, that generates tentative forward channel estimates at each stage of the forward recursion through the equalizer trellis for each hypothesized survivor path based on the known training symbols and the initial forward channel estimates, as described above. Forward parameter estimator 140 generates a set of forward channel estimates for each of the desired and interfering signal channels by selecting the tentative forward channel estimates associated with the surviving paths at the final stage of the forward recursion. The set of forward channel estimates is then used by the backward parameter estimator 144 as the initial backward channel estimates for each of the desired and interfering signal channels.

Backward parameter estimator 144 is also a PSP parameter estimator. Therefore, based on the initial backward channel estimates provided by the forward parameter estimator 140, the known training symbols, and the received signal, the backward parameter estimator 144 generates tentative backward channel estimates at each stage of the backward recursion for each of the hypothesized surviving paths. Backward parameter estimator 144 generates a set of backward channel estimates for each of the desired and interfering signal channels by selecting the tentative forward channel estimates associated with the surviving paths at the final stage of the backward recursion.

As with the embodiments discussed above, the blind parameter estimator 130 of FIG. 8 may perform multiple iterations of the forward and backward parameter estimation process. However, in this embodiment, a single iteration comprises a forward recursion of the equalizer trellis in the forward parameter estimator 140 followed by a backward recursion of the equalizer trellis in the backward parameter estimator 144, where the set of forward channel estimates generated by the forward parameter estimator 140 operates as the initial backward channel estimates for the backward parameter estimator 144.

In the first iteration, the forward parameter estimator 140 uses the initial forward channel estimates provided by initialization circuit 124. However, for subsequent iterations, the forward parameter estimator 140 uses the set of backward channel estimates generated by the backward parameter estimator 144 in the current iteration as the initial forward channel estimates. After the final iteration, final channel estimate selector 148 selects the backward channel estimate from the set of backward channel estimates having the best error metric for each of the desired and interfering signal channels.

While FIG. 8 illustrates that each iteration of the parameter estimation process begins with the forward parameter estimator 140 and ends with the backward parameter estimator 144, it will be appreciated that the process may begin and/or end in any direction. For example, the serial blind parameter estimator 130 of FIG. 8 may use a backward forward parameter estimation system with a backward parameter estimator 144 followed by a forward parameter estimator 140. Alternatively, blind parameter estimator 130 may include multiple parameter estimators, where consecutive parameter estimators perform opposite recursions through the equalizer trellis. For example, blind parameter estimator 130 may comprise a forward-backward-forward parameter estimator or a backward-forward-backward parameter estimator. As such, the present invention is not limited to the specific embodiment shown.

Figure 9:
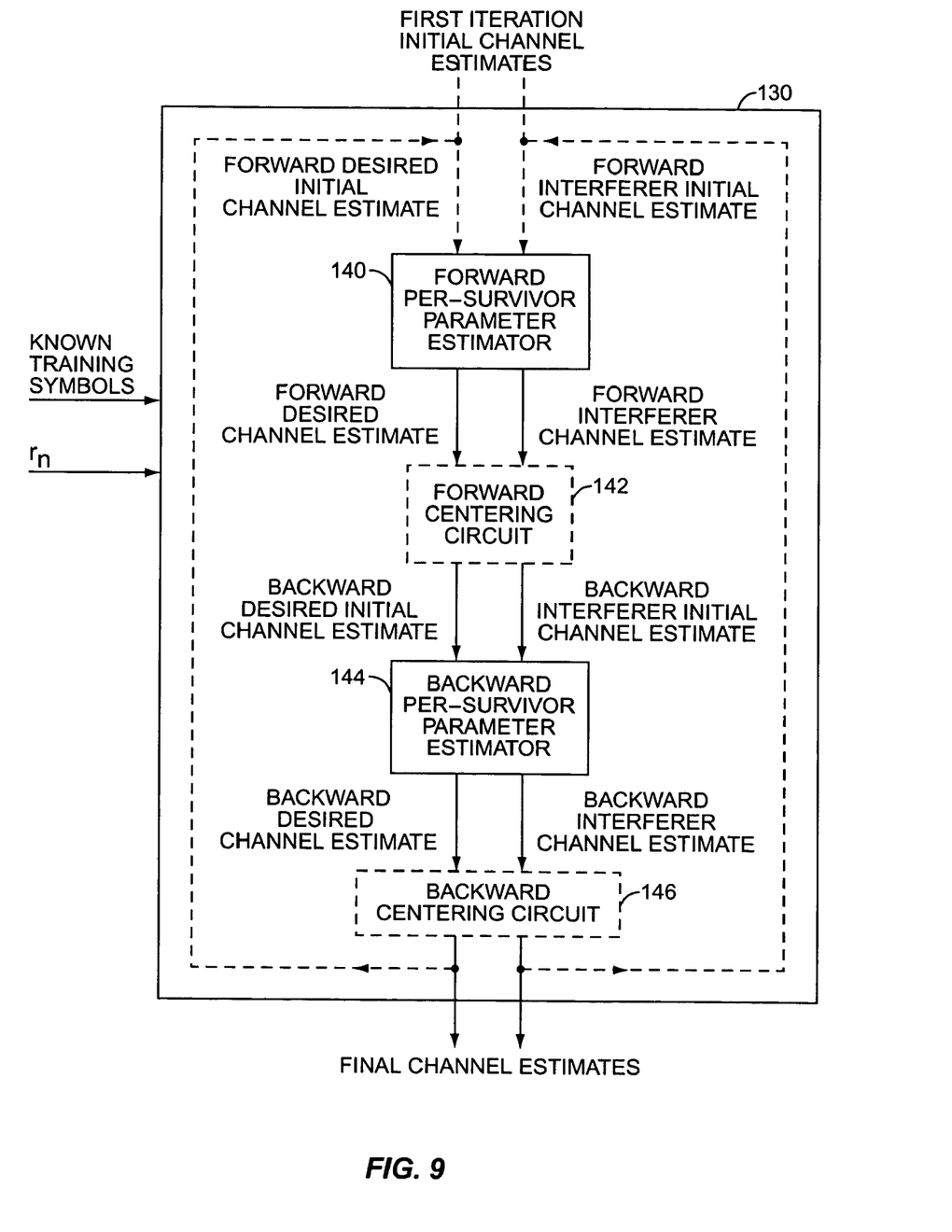
FIG. 9 illustrates another block diagram of one exemplary PSP multi-directional parameter estimator according to the present invention.

FIG. 9 illustrates another embodiment of a blind parameter estimator 130 according to the present invention. Like the embodiment of FIG. 8, the blind parameter estimator 130 of FIG. 9 includes serial forward and backward parameter estimators 140 and 144. However, in the embodiment of FIG. 9, the set of forward channel estimates generated by forward parameter estimator 140 comprises the tentative forward channel estimate for each of the desired and interfering signal channels associated with the surviving path having the best error metric. As a result, the set of forward channel estimates used by the backward parameter estimator 144 as the initial backward channel estimates comprises a single forward channel estimate for each of the desired and interfering signal channels.

Similarly, the set of backward channel estimates generated by backward parameter estimator 144 comprises the tentative backward channel estimate for each of the desired and interfering signal channels associated with the surviving path having the best error metric. As a result, the set of backward channel estimates used by the forward parameter estimator 144 in a subsequent iteration as the initial forward channel estimates comprises a single backward channel estimate for each of the desired and interfering signal channels. After the final iteration, blind parameter estimator 130 uses the backward channel estimates generated in the final iteration as the final channel estimates.

When included in blind parameter estimator 130, forward centering circuit 142 and backward centering circuit 146 function as described above to center the forward and backward channel estimates for the desired and interfering signal channels provided by forward and backward parameter estimators 140 and 144, respectively. In this embodiment, the backward parameter estimator 144 uses the centered forward channel estimates form the current iteration as the initial backward channel estimates. Further, in all iterations except the first iteration, forward parameter estimator 140 uses the centered backward channel estimates as the initial forward channel estimates for the subsequent iteration. After the final iteration, backward parameter estimator 144 bypasses the backward centering circuit 146 and uses the backward channel estimates generated in the final iteration by the backward parameter estimator 144 as the final channel estimates.

While FIG. 9 shows a blind parameter estimator 130 including a forward parameter estimator 140 followed by a backward parameter estimator 144, it will be appreciated that the blind parameter estimation process may begin and/or end in any direction. Therefore, like the embodiment of FIG. 8, the present invention is not limited to the specific embodiment shown.

The above describes exemplary blind parameter estimation methods and apparatus for jointly estimating the desired and interfering signal channels used to propagate the desired signal channel and the interfering signal channel, respectively. The above-described methods and apparatus may be used in any wireless communication device, including those with single or multiple antenna receivers.

The blind parameter estimation process discussed above assumes that there are no known symbols for any of the received interfering signals. However, the present invention is not so limited. For example, in situations where the training symbols of some of the interfering signals are known, the known training symbols may be used to estimate the corresponding interfering signals according to any conventional means, while the interfering signals having no known symbols are estimated according to the blind parameter estimation process described above.

Further, while the above assumes that the receiver 120 has knowledge of the training symbols associated with the desired signal, such knowledge is not required. When there are no known training symbols available to the receiver, initialization circuit sets the desired initial channel estimates and the initial interfering channel estimates to a predefined value as discussed above. For example, initialization circuit 124 may set all of the channel taps of the initial and/or desired interfering channel estimate to zero. Alternatively, initialization circuit 124 may set one of the channel taps to a small value greater than zero, such as 0.1, and set the remaining channel taps to zero. In any event, equalizer 134 uses the sampled received signal $r_n$ and the initial channel estimates provided by initialization circuit 124 to hypothesize the symbols of both the desired signal and the interfering signal using joint demodulation.

It will also be appreciated that the channel estimates for both the desired and interfering signal channels may be updated at any desired rate. For example, the channel estimates may be updated for every received symbol. Alternatively, the channel estimates may be updated every X symbols. For example, the channel estimates may be updated ever X=4 symbols.

Figure 10:
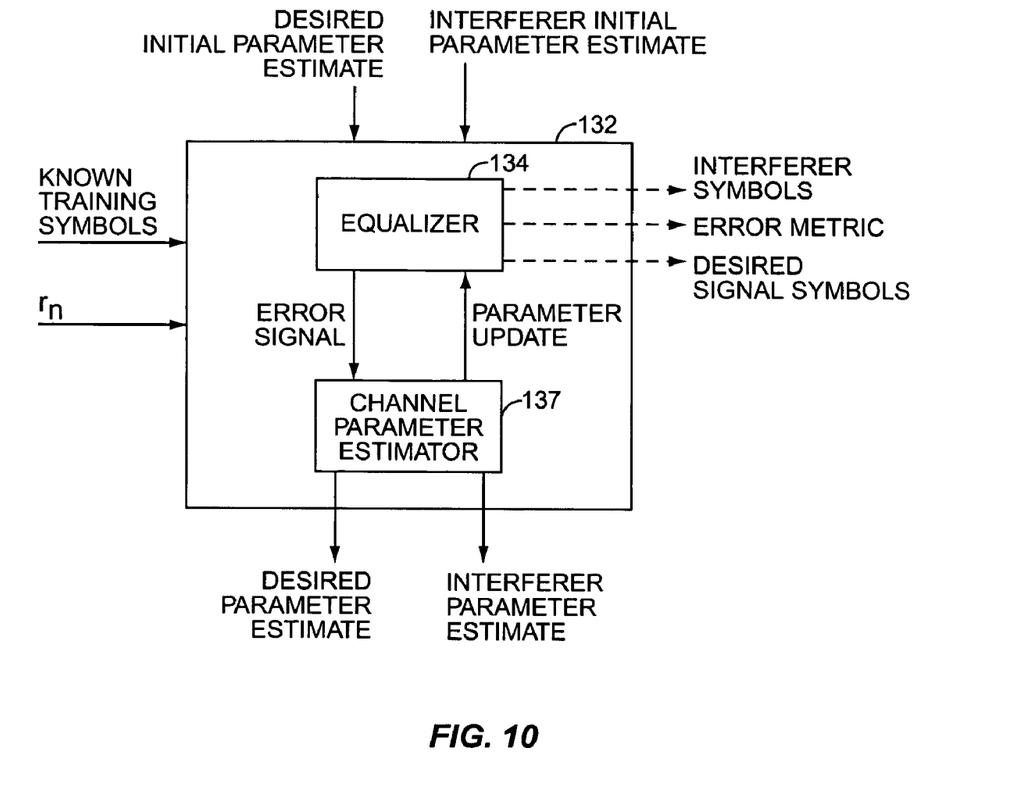
FIG. 10 illustrates a generic block diagram of a parameter estimator.

In addition, while the above is described in terms of joint channel response estimation, the present invention may be used to estimate any number of joint channel parameters. As shown in FIG. 10, the channel estimator(s) 136 used in the forward and backward parameter estimators 140 and 144 may be replaced by channel parameter estimator(s) 137 that estimate any channel parameter according to the process described above. These channel parameters may include channel response estimates, frequency offsets, DC offsets, etc.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of joint parameter estimation based on a received signal comprising a desired signal and an interfering signal and containing known symbols associated with the desired signal comprising:
   performing a forward recursion through a trellis equalizer representing interferer symbols to generate a forward parameter estimate for each of a desired signal channel and an interfering signal channel, and to generate a corresponding forward error metric based on the received signal and initial forward parameter estimates;
   performing a backward recursion through the trellis equalizer, independent from the forward recursion, to generate a backward parameter estimate for each of the desired signal channel and the interfering signal channel, and to generate a corresponding backward error metric based on the received signal and initial backward parameter estimates; and
   selecting a final parameter estimate for each of the desired and interfering signal channels based on a comparison between the forward and backward error metrics.

2. The method of claim 1 further comprising performing the forward and backward recursions iteratively.

3. The method of claim 2 further comprising:
   centering the backward parameter estimates; and
   using the centered backward parameter estimates generated in a current iteration as the initial backward parameter estimates, respectively, for a subsequent iteration.

4. The method of claim 2 further comprising using the forward and backward parameter estimates generated in a current iteration as the initial forward and backward parameter estimates, respectively, for a subsequent iteration.

5. The method of claim 2 further comprising:
   centering the forward parameter estimates; and
   using the centered forward parameter estimates generated in a current iteration as the initial forward parameter estimates, respectively, for a subsequent iteration.

6. The method of claim 5 further comprising:
   centering the backward parameter estimates; and
   using the centered backward parameter estimates generated in a current iteration as the initial backward parameter estimates, respectively, for a subsequent iteration.

7. The method of claim 1 further comprising:
   at each stage of the forward recursion, generating a set of tentative forward parameter estimates for each of the desired signal channel and the interfering signal channel, and generating corresponding tentative forward error metrics based on the received signal and the forward parameter estimates obtained in a previous stage of the forward recursion; and
   generating the forward parameter estimate for each of the desired and interfering signal channels and generating the forward error metric based on the set of tentative forward parameter estimates and the corresponding tentative forward error metrics.

8. The method of claim 1 further comprising:
   at each stage of the backward recursion, generating a set of tentative backward parameter estimates for each of the desired signal channel and the interfering signal channel, and generating corresponding tentative backward error metrics based on the received signal and the backward parameter estimates obtained in a previous stage of the backward recursion; and
   generating the backward parameter estimate for each of the desired and interfering signal channels, and generating the backward error metric based on the set of tentative backward parameter estimates and the corresponding tentative backward error metrics.

9. The method of claim 1 wherein the known symbols of the received signal comprise known training symbols associated with the desired signal.

10. The method of claim 1 further comprising hypothesizing interfering signal symbols based on at least one of the forward and backward parameter estimates.

11. The method of claim 1 wherein the forward and backward parameter estimates generated for each of the desired and interfering signal channels comprises forward and backward channel estimates, and wherein the final parameter estimates comprise final channel estimates for each of the desired and interfering signal channels.

12. The method of claim 1 wherein performing the forward recursion, performing the backward recursion, and selecting the final parameter occurs for every symbol of the received signal.

13. The method of claim 1 wherein performing the forward recursion, performing the backward recursion, and selecting the final parameter occurs for every X symbols of the received signal.

14. A blind parameter estimator in a wireless communication device to perform joint parameter estimation based on a received signal comprising a desired signal and an interfering signal and containing known symbols associated with the desired signal, the blind parameter estimator comprising:
   a forward parameter estimator comprising:
      a forward trellis equalizer representing interferer symbols; and
      a forward channel parameter estimator to generate a forward parameter estimate based on a forward recursion through the forward trellis equalizer for each of a desired signal channel and an interfering signal channel, and to generate a corresponding forward error metric based on the received signal and initial forward parameter estimates;
   a backward parameter estimator comprising:
      a backward trellis equalizer representing interferer symbols; and
      a backward channel parameter estimator to generate a backward parameter estimate based on a backward recursion through the backward trellis equalizer for each of a desired signal channel and an interfering signal channel, and to generate a corresponding backward error metric based on the received signal and initial backward parameter estimates; and
   a final parameter selector to select a final parameter estimate for each of the desired and interfering signal channels based on a comparison between the forward and backward error metrics.

15. The blind parameter estimator of claim 14 wherein the blind parameter estimator performs the forward and backward recursions iteratively.

16. The blind parameter estimator of claim 15 wherein in each iteration except the first iteration, the forward parameter estimator uses the forward parameter estimates generated in a current iteration as the initial forward parameter estimates for a subsequent iteration.

17. The blind parameter estimator of claim 16 further comprising a first centering circuit to center the forward parameter estimates after the forward recursion in each iteration except the last iteration.

18. The blind parameter estimator of claim 17 wherein in each iteration except the first iteration, the backward parameter estimator uses the backward parameter estimates generated in a current iteration as the initial backward parameter estimates for a subsequent iteration.

19. The blind parameter estimator of claim 18 further comprising a second centering circuit to center the backward parameter estimates after the backward recursion in each iteration except the last iteration.

20. The blind parameter estimator of claim 15 wherein in each iteration except the first iteration, the backward parameter estimator uses the backward parameter estimates generated in a current iteration as the initial backward parameter estimates for a subsequent iteration.

21. The blind parameter estimator of claim 20 further comprising a second centering circuit to center the backward parameter estimates after the backward recursion in each iteration except the last iteration.

22. The blind parameter estimator of claim 14 wherein the forward parameter estimator comprises a per-survivor forward parameter estimator that generates a set of tentative forward parameter estimates at each stage of the forward recursion for each of the desired signal channel and the interfering signal channel, and generates corresponding tentative forward error metrics based on the received signal and the forward parameter estimates obtained in a previous stage of the forward recursion.

23. The blind parameter estimator of claim 22 wherein the per-survivor forward parameter estimator generates the forward parameter estimate for each of the desired and interfering signal channels, and generates the forward error metric based on the set of tentative forward parameter estimates and the corresponding tentative forward error metrics.

24. The blind parameter estimator of claim 14 wherein the backward parameter estimator comprises a per-survivor backward parameter estimator that generates a set of tentative backward parameter estimates at each stage of the backward recursion for each of the desired signal channel and the interfering signal channel, and generates corresponding tentative backward error metrics based on the received signal and the backward parameter estimates obtained in a previous stage of the backward recursion.

25. The blind parameter estimator of claim 24 wherein the per-survivor backward parameter estimator generates the backward parameter estimate for each of the desired and interfering signal channels, and generates the backward error metric based on the set of tentative backward parameter estimates and the corresponding tentative backward error metrics.

26. The blind parameter estimator of claim 14 wherein the known symbols associated with the desired signal comprise known training symbols associated with the desired signal.

27. The blind parameter estimator of claim 14 wherein at least one of the forward parameter estimator and the backward parameter estimator hypothesize interfering signal symbols based on at least one of the forward and backward parameter estimates.

28. The blind parameter estimator of claim 14 wherein the forward and backward parameter estimators generate forward and backward channel estimates for each of the desired and interfering signal channels.

29. The blind parameter estimator of claim 28 wherein the final parameter selector generates final channel estimates for each of the desired and interfering signal channels.

30. A wireless communication device comprising:
a transmitter for transmitting wireless signals to a different wireless communication device; and
a receiver for receiving a wireless signal comprising a desired signal and an interfering signal and containing known symbols associated with the desired signal, the receiver comprising a blind parameter estimator comprising:
a forward parameter estimator comprising:
a forward trellis equalizer representing interferer symbols; and
a forward channel parameter estimator to generate a forward parameter estimate based on a forward recursion through the forward trellis equalizer for each of a desired signal channel and an interfering signal channel, and to generate a corresponding forward error metric based on the received signal and initial forward parameter estimates;
a backward parameter estimator comprising:
a backward trellis equalizer representing interferer symbols; and
a backward channel parameter estimator to generate a backward parameter estimate based on a backward recursion through the backward trellis equalizer for each of a desired signal channel and an interfering signal channel, and to generate a corresponding backward error metric based on the received signal and initial backward parameter estimates; and
a final parameter selector to select a final parameter estimate for each of the desired and interfering signal channels based on a comparison between the forward and backward error metrics.

31. The wireless communication device of claim 30 wherein the blind parameter estimator performs the forward recursion iteratively, and wherein in each iteration except the first iteration, the forward parameter estimator uses the forward parameter estimates generated in a current iteration as the initial forward parameter estimates for a subsequent iteration.

32. The wireless communication device of claim 31 wherein the blind parameter estimator further comprises a first centering circuit to center the forward parameter estimates after each iteration except the last iteration, and wherein the forward parameter estimator uses the centered forward parameter estimates generated in the current iteration as the initial forward parameter estimates for the subsequent iteration.

33. The wireless communication device of claim 30 wherein the blind parameter estimator performs the backward recursion iteratively, and wherein in each iteration except the first iteration, the backward parameter estimator uses the backward parameter estimates generated in a current iteration as the initial backward parameter estimates for a subsequent iteration.

34. The wireless communication device of claim 33 wherein the blind parameter estimator further comprises a backward centering circuit to center the backward parameter estimates after the backward recursion in each iteration except the last iteration, and wherein the backward parameter estimator uses the centered backward parameter estimates generated in the current iteration as the initial backward parameter estimates for the subsequent iteration.

35. The wireless communication device of claim 30 wherein the forward parameter estimator comprises a per-survivor forward parameter estimator that generates a set of tentative forward parameter estimates at each stage of the forward recursion for each of the desired signal channel and the interfering signal channel, and generates corresponding tentative forward error metrics based on the received signal and the forward parameter estimates obtained in a previous stage of the forward recursion.

36. The wireless communication device of claim 35 wherein the per-survivor forward parameter estimator generates the forward parameter estimates for each of the desired and interfering signal channels, and generates the forward error metrics based on the set of tentative forward parameter estimates and the corresponding tentative forward error metrics.

37. The wireless communication device of claim 30 wherein the backward parameter estimator comprises a per-survivor backward parameter estimator that generates a set of tentative backward parameter estimates at each stage of the backward recursion for each of the desired signal channel and the interfering signal channel, and generates corresponding tentative backward error metrics based on the received signal and the backward parameter estimates obtained in a previous stage of the backward recursion.

38. The wireless communication device of claim 37 wherein the per-survivor backward parameter estimator generates the backward parameter estimates for each of the desired and interfering signal channels, and generates the backward error metrics based on the set of tentative backward parameter estimates and corresponding tentative backward metrics to the final channel selector.

39. The wireless communication device of claim 30 wherein the known symbols associated with the desired signal comprise known training symbols associated with the desired signal.

40. The wireless communication device of claim 30 further comprising an initialization circuit to generate initial forward and backward parameter estimates for a first iteration of the forward and backward recursions through the forward and backward parameter estimators, respectively.

41. The wireless communication device of claim 30 wherein the forward and backward parameter estimators generate forward and backward channel estimates for each of the desired and interfering signal channels.

42. The wireless communication device of claim 41 wherein the final parameter selector generates final channel estimates for each of the desired and interfering signal channels.

* * * * *

UNITED STATES PATENT AND TRADEMARK OFFICE
CERTIFICATE OF CORRECTION

PATENT NO. : 7,643,548 B2  
APPLICATION NO. : 10/950868  
DATED : January 5, 2010  
INVENTOR(S) : Abdulrauf Hafeez Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1472 days.

Signed and Sealed this

Sixteenth Day of November, 2010

David J. Kappos  
*Director of the United States Patent and Trademark Office*